May 27, 1958     C. M. STITT     2,836,707
LIGHT FILTER
Filed Oct. 1, 1954
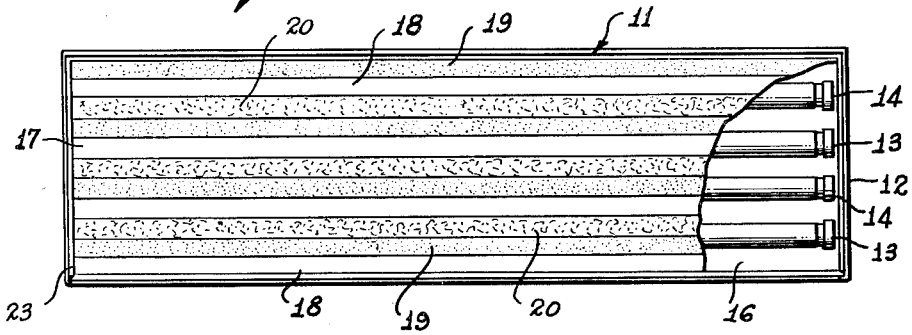
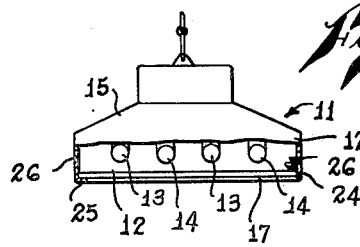
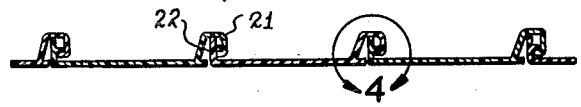
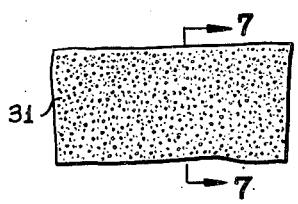
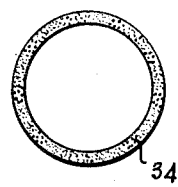
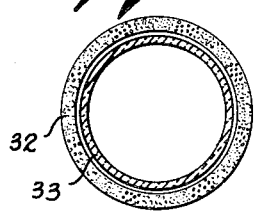
INVENTOR.
CHARLES MONROE STITT
BY George R Bliss
Attorney ary* # United States Patent Office 2,836,707
Patented May 27, 1958

2,836,707

LIGHT FILTER

Charles Monroe Stitt, Los Angeles, Calif.

Application October 1, 1954, Serial No. 459,789

4 Claims. (Cl. 240—1.1)

This invention relates to a light filter. It relates particularly to a light filtering means for receiving light from a given light source of a specific nature, transmitting a portion of the rays of predetermined wave lengths for illuminating purposes, and eliminating from the transmitted light rays of other wave lengths, and especially to a light filtering means for producing from a given light source, sunlight, or the near sunlight which we call daylight.

Such filtering means are also called light "screens." The expression "light filters" will be used herein to include both light screens and light filters. The invention also relates to the method of making such filters.

Since the light sensitive nerves of the human eye and brain are better adapted, by reason of their evolutionary origin and developement, to receive the light of the sun and perceive objects illuminated by sunlight than by light from any other light source, this invention is adapted primarily to convert light from any specific kind of light source to light of the same or approximately the same composition of wave lengths as sunlight. While sunlight closely approaches "white light" in its wave length characteristics, it is not identical with pure white light, which physically is a combination of all the wave lengths of the spectrum in unmodified relative brilliance. Such a combination of all the wave lengths of the spectrum gives rise to the sensation of whiteness when impinging upon the retina of the eye.

Theoretically pure white light is never observed by the eye in nature, but is probably most nearly realized in the light reflected from pure snow. While the nature of the sun is such as to give off light which is "near white" or "off white," this light may be changed to become more "off white" by atmospheric and other conditions.

"Daylight" is a term which we apply to sunlight which has been somewhat, but not greatly, modified by the substance through which it has passed (as for instance the earth's atmosphere) or from which it has been reflected (as for instance from the walls of a building or of a room). It is often a mixture of direct sunlight, diffused sunlight, refracted sunlight and reflected sunlight. The word "daylight" is then a term loosely applied to sunlight of which the wave length composition has been modified. As light travels from the sun through extramundane space it is unmodified. If the later modification is so extensive as to produce a sensation of color decidedly other than white, it cannot be called "daylight" in the sense in which that word is used herein.

The great advantage of illumination by white light or near white light, such as daylight or sunlight, is in the field of color perception by the eye and brain. We know that objects absorb the light of some of the wave lengths out of all the light which strikes them, and reflect the remaining light of other wave lengths. We attribute to each object the color psychologically associated with the reflected wave lengths. If the light striking an object is sunlight or daylight, the wave lengths reflected from the object gives rise to a certain definite color sensation and we attribute that color to the object. But if all or a portion of these normally reflected wave lengths are not present in the light which strikes the object, the wave lengths reflected from the object are deficient in one or more of the normal wave length components which give rise to the normal sensation of color associated psychologically with that object and we see the object as having an unnatural color. Thus if an object is in reality purple in color, and the light which illuminates it is deficient in waves of red length, the object will appear blue and not purple. For this and other reasons of a similar nature it is desirable that the light illuminating objects combine all the wave lengths of sunlight or near sunlight or light of any other source which also approaches sunlight in its wave length composition.

So it is desirable to convert light from any source to sunlight or good daylight, for use in reading, in shop work, in writing, in painting, in viewing white and chromatically colored objects, as in art galleries, and for use under many other conditions of our daily activities. The principle of this invention is to modify, by filtering, the light received from a source, so as to pass on to the objects and areas to be illuminated, three or more different combinations of rays of wave lengths lying in different spectrum areas, such that when commingled, they produce white light or near white light. Note that if the source is white light, the multi-colored filter will pass on three or more primary colors, which when commingled will again produce white light, but of somewhat less brilliance due to the absorption of wave lengths by the filter.

The basic principle of the invention, i. e. segregation of some component wave lengths and their reassembling in a desired combination of wave lengths permits the elimination both of unwanted visible wave lengths and also of harmful invisible wave lengths at the ultra violet or infrared ends of the spectrum.

In adapting the principles of this invention to practice, it is apparent then, that its greatest use is in converting light from various sources, artificial and otherwise, to a light which is substantially the same as daylight or sunlight.

While certain inventive features of the filter and the method of making it, which are here disclosed, may be embodied in filters designed for various purposes, the invention is described herein for illustrative purposes as applied to a filter and its method of manufacture, which is designed to convert to daylight or near sunlight, the light emanating from the tube or tubes of a fluorescent lamp, which is conventionally made with parallel tubes of alternating white daylight glass tubes and cream colored soft daylight glass tubes. It will be understood that the invention broadly may be adapted to filter light from either of the above types of fluorescent tubes, or from any other type or combination of types of such tubes, from incandescent electric lamps, arc lamps, gas lights, or from light of any other character or source.

The prior art discloses numerous filters of a transparent or translucent material such as glass, various plastic materials and the like, designed to transform light from different specific light sources to sunlight, white light, daylight or near daylight, as well as to light of other characteristics. In such prior art filters of the daylight or other kind, the filter is usually made up of a number of pieces of material of different colors which transmit rays of different wave length composition, the pieces being assembled in one structure in a manner such that the rays from different pieces merge after passage through the filter to produce daylight or other desired types of light of multi-colored wave lengths. These pieces have been of large area, assembled to present a continuous extended surface, with the result that the merging of the light rays after passing through the filter has not been of satisfactory character.

To overcome this, these filters of large pieces of different colored materials, assembled continuously in a single surface, have been sometimes mounted for rapid rotation to commingle and blend the rays of different colors to produce daylight, white light or any other desired type of light. One object of this invention is the provision of a filter in which the pieces of material are relatively small and are combined in a stationary relationship to present a large number of relatively very small contiguous areas of different colored material so as to cause a merger of the several different colored rays immediately after passage through the filter. In one form of the invention these contiguous areas approach the molecular size.

In the drawings which illustrate one particular form of embodiment of the invention:

Figure 1 is a bottom plan view of a fluorescent lamp equipped with a filter of this invention, with the filter broken away to show the construction of the lamp.

Figure 2 is an end view of the lamp with the near end wall partially broken away.

Figures 3 and 4 show the construction of one form of the filter, in which parallel narrow strips, preferably of a colored plastic material are assembled in one structure.

Figure 5 shows another form of the filter, consisting of an integral plate of plastic with mottled areas of different colors.

Figure 6 is a plan view of a piece of plastic showing still another form of the filter of the invention in which the particles or bodies of different colored plastic are so small as to make the filter appear as a single homogeneous sheet of a single color.

Figure 7 shows a filter having slight ribbing or fluting of the surface of the filter.

Figure 8 shows an envelope tube of the material shown in Figure 6, and a fluorescent tube encircled by the envelope tube.

Figure 9 shows the fluorescent tube made of the material shown in Figure 6.

The fluorescent lamp 11, shown in Figures 1 and 2, comprises the conventional, elongated, rectangular shaped, sheet metal, open-bottomed casing 12, in which are mounted in any suitable fashion a plurality, as for example two parallel white daylight fluorescent tubes 13, and an equal number of cream colored soft daylight fluorescent tubes 14, arranged parallel to and in alternation with the tubes 13. In the chamber 15 formed on top of the casing 12 are disposed the electrical connecting terminals, and the conventional starter (not shown). At the top of the casing is placed a white plastic reflector 16 to throw downwardly the light from the tubes. All of this is conventional and not being a part of the invention is not described in detail.

The horizontally positioned filter 17 is secured to the underside of the casing in any convenient and structurally suitable manner.

The filter 17, shown in the drawing, comprises a plurality of narrow, elongated strips 18, 19 and 20 of a transparent or preferably translucent material such as glass, polystyrene (vinylbenzene) or a similar resinous plastic material. These strips may be about 1¼ inches wide for the casing of the usual size used in fluorescent lighting equipment. These strips may be made each with a bead 21 on one end and a flange 22 on the other edge, the flange in one strip engaging in an articulating joint the flange of the adjoining strip and thus holding it against lateral movement. See Figures 3 and 4. The strips may be secured together at their ends in a frame 23. The frame 23 holding the ends of the assembled and jointed strips may be slid through cutaway openings 24 in the sheet metal at the corresponding ends of the lower flanges 25 of the ends 26 of the casing, and allowed to rest on these flanges 25 and locked against removal in any desired manner.

The strips 18, 19 and 20 of the filter are made of polystyrene (vinylbenzene) strips of three different colors respectively, arranged in a recurring triple succession, the material of the body of any one strip being homogeneous throughout as to color, and other characteristics. Preferably there should be the same number of strips of each color, and at least one set of three strips below each fluorescent tube, although such relationships are not necessary.

These strips are made by adding to powdered polystyrene coloring powder and mixing the two powders to a homogeneous powder of uniform color. At least three coloring powders are used and three resulting powder mixtures are obtained. Strips are made from each of these powder mixtures by first heating the powder to the powder to the proper plasticising temperature in a mold and then extruding the plastic mass from the mold through a die of the same cross sectional opening as the sectional shape of the strip.

As an illustration of proper colors for any desired purpose, as for example, to convert the light from a conventionally termed daylight fluorescent tube to true daylight, the panelled strips 18, 19, and 20 will be colored with coloring powders to produce respectively red rays, violet rays, and blue green rays. This same, or any other combination of chromatic colors may be used for a variety of light sources which do not vary in character greatly from the "daylight" fluorescent tubes, provided that the brilliance of the three colors is relatively modulated to compensate for the variation in the character of the light source. For achieving the greatest brilliance of the commingled rays proceeding from the three sets of strips, however, the actual angstrom unit hues of the light rays from the three sets of strips should be ascertained accurately and carefully by the trial and error method for each light source.

It is apparent that to produce white light, or near white light such as sunlight or daylight, from any source of light, the source light must have all or most of the spectrum wave lengths. The function of a filter of this invention then, insofar as the invention relates to the production of white light or near white light, is that of transmitting some light of several primary spectrum wave lengths of all the light proceeding from the light source, so balanced as to hue, brilliance and saturation as to produce a light approaching white light in its effect on the retina.

The filter 30 shown in Figure 5 is made by grinding to a powder approximately the same quantity of stock shapes of each of the three colored materials, which may be purchased from the manufacturer, scattering the three powders in about the same quantity in localized concentrations respectively over the horizontal bottom face of an open-topped mold and then heating and pressing the powders into plate form. This method is desirable in forming circular filters for placing over the headlights, flood lights, or other circular illuminators. The resultant filter presents a surface of three colors with mottled areas merging into each other as shown in Figure 5.

Figure 6 shows still another form of filter of the integral solid piece type. This filter 31 has the appearance of a solid colored body. It is made by placing in a mold a homogeneous mixture of the three colored polystyrene powders, and then heating the mixture and extruding it through a die to produce a sheeted strip of the thickness and overall width of the filter. Particles or bodies of the three colors are still present throughout the molded material, but they are so closely spaced that to the eye it looks as though the sheet was of only one color. But each tiny particle or body of colored polystyrene (vinylbenzene) performs its filtering function and the filtered rays are intimately commingled, even to some extent before they leave the body of the filter.

In Figure 8 the tube 32 having a composition similar to the filter 31 is mounted concentrically about the fluorescent tube 33 similar to the tube 13 of Figures 1 and 2.

In Figure 9, the material of the fluorescent tube 34 is itself made of the material shown in Figure 6.

It will be observed that in all forms of the invention the filter comprises three or more differently colored materials, in pieces or particles of greatly differing sizes ranging from the separate long strips of Figure 2 to the tiny particles of three or more different colors which enter into the homogeneous mixture of the form of the invention illustrated in Figures 6, 8 and 9. In all forms of the invention the source light is partly absorbed and partly transmitted; the transmitted part is separated into predetermined wave lengths, of the desired characteristic attributes, the separated wave lengths are commingled, proceed to illuminated object and are reflected back to the eye retina.

It has been found that for use with fluorescent white daylight tubes, a quantity ratio of blue green, violet, and red rays of 5 to 3 to 2 gives good results. Translucent material is preferable to a clear transparent material for use in making the filter, since the diffusive effect of a translucent material facilitates the commingling of the light rays of the three colors and decreases the distance from the filter at which effective commingling is accomplished. It also veils from the eye the outlines of the light tubes 13 and 14 and softens their glare.

Forming a slight ribbing, fluting or corrugation in the molded sheet as shown in Figure 7 increases diffusion and strengthens the sheet.

I claim:

1. A light filter designed for a fluorescent light to convert light rays from said fluorescent light into rays of different wave length characteristics, which when comingled and blended in said filter produce a sensory perception of white light, said filter comprising a large number of relatively very small individual contiguously disposed cohesively assembled particles, each being a homogeneous body of light permeable material for one and only one of three predetermined spectral bands of angstrom unit wave lengths corresponding to blue-green, violet, and red, so that a first number of said particles are all identically characterized by being filteringly capable of producing only blue-green; a second number of said particles are all identically characterized by being filteringly capable of producing only violet; and a third number of said particles are all identically characterized by being filteringly capable of producing only red; each of the particles of one number being randomly interspersed with each of the particles of the other numbers, there being a substantially uniform and even distribution of the particles with respect to their color characteristics in all directions throughout the mass of the filter.

2. A filter according to claim 1, in which said first number, said second number, and said third number of particles are substantially equal.

3. A filter according to claim 1, in the shape of an elongated tube disposed about said fluorescent light.

4. A filter according to claim 1, comprising an outer enclosure for said fluorescent light.

References Cited in the file of this patent

UNITED STATES PATENTS

| Number | Name | Date |
|---|---|---|
| 727,495 | Todd | May 5, 1903 |
| 974,464 | Brasseur | Nov. 1, 1910 |
| 1,101,026 | Hussey | June 23, 1914 |
| 1,391,585 | Sheringham | Sept. 20, 1921 |
| 1,450,923 | Oliver | Apr. 10, 1923 |
| 1,476,874 | Carpenter | Dec. 11, 1923 |
| 1,784,171 | Bertling | Dec. 9, 1930 |
| 1,822,172 | Pfleumer et al. | Sept. 8, 1931 |
| 1,920,317 | Oexmann | Aug. 1, 1933 |
| 1,933,988 | Lewis | Nov. 7, 1933 |
| 2,103,085 | McKeag et al. | Dec. 21, 1937 |
| 2,110,500 | Chiera | Mar. 8, 1938 |
| 2,364,707 | Glover | Dec. 12, 1944 |
| 2,366,216 | Roberts | Jan. 2, 1945 |
| 2,515,236 | Kunins | July 18, 1950 |
| 2,569,388 | Rogers et al. | Sept. 25, 1951 |
| 2,661,391 | Bedford | Dec. 1, 1953 |

FOREIGN PATENTS

| Number | Country | Date |
|---|---|---|
| 338,876 | France | June 18, 1904 |
| 105,877 | Austria | Mar. 10, 1927 |
| 494,495 | Great Britain | Oct. 26, 1938 |